Dec. 3, 1929.    F. N. CAMPBELL ET AL    1,738,228
GLASS CUTTING
Filed June 24, 1929
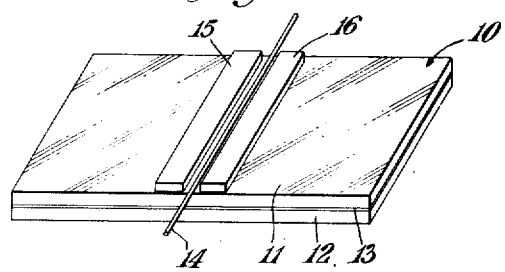
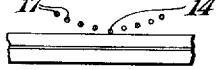
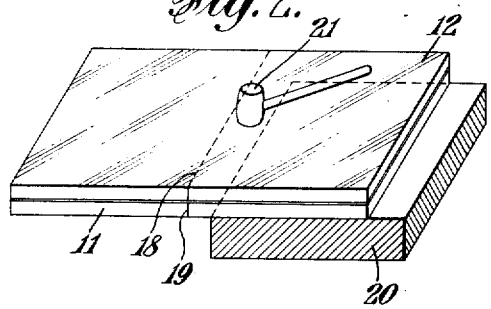
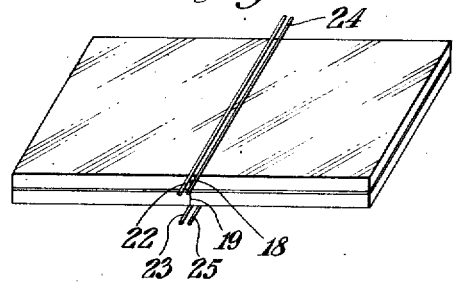
INVENTORS
Jules Myatt
Furman N. Campbell.
BY
their ATTORNEYS Patented Dec. 3, 1929

1,738,228

UNITED STATES PATENT OFFICE

FURMAN N. CAMPBELL, OF NEW HAVEN, AND JULES MYATT, OF EAST HAVEN, CONNECTICUT, ASSIGNORS TO BESSIE L. GREGG, OF NEW HAVEN, CONNECTICUT

GLASS CUTTING

Application filed June 24, 1929. Serial No. 373,245.

This invention relates to processes and apparatus for severing and trimming glass such as laminated glass, comprising a plurality of layers of glass between which layers of shatter preventing material are interposed, such as viscose.

It is an object of this invention to provide process and means for cutting such laminated glass rapidly and economically and with such a degree of accuracy as to usually eliminate any necessity for subsequently grinding the glass edges to the desired measure.

It is a further object of the invention to provide such a process which may be practiced with substantially no wastage of the glass arising from uncontrolled cracking thereof or from injury to the viscose or other shatter preventing or binding material, particularly adjacent the line of cutting.

Various further and also various more specific objects, features and advantages will clearly appear from the detailed description given below taken in connection with the accompanying drawings which form a part of this specification, and illustrate merely by way of example one embodiment of the invention.

This application is a continuation in part of applicants' copending application Ser. No. 325,121, filed December 10, 1928.

The invention consists in such novel features, arrangements, methods and products as shown, described and claimed in connection with the embodiments of the invention herein disclosed by way of example only.

In the drawings, Figs. 1, 2 and 3 respectively indicate somewhat schematically arrangements of the apparatus for performing three successive steps of the process of the invention in one of its embodiments, and Fig. 4 indicates an alternative apparatus arrangement.

In Fig. 1 a sheet of laminated glass is indicated at 10 comprising layers of glass 11 and 12 between which is interposed a sheet 13 of shatter preventing or binding material such as viscose or other body, which may be softened, rendered plastic or to a certain degree rendered releasable from the glass upon application of heat.

A process and suitable apparatus will first be described for use in the cracking, splitting or cutting one of the layers of glass along the desired line. Subsequently the perferred methods for cutting or cracking the other layer of glass and for dividing the layer of viscose will be described.

An electrically heated conductor is shown at 14 arranged along the predetermined desired line of cutting of the glass. The wire 14 is preferably maintained in uniform contact with the glass at the desired line of cutting. This wire may be connected to a suitable source of current such as to heat the wire to a red heat or in the neighborhood thereof.

If the desired line of cutting is relatively short, that is if only a relatively narrow piece of the glass is to be cut we have found that one of the sheets of glass, as indicated at 11, may be quickly cracked accurately at the desired line of cutting merely by the momentary application of the single hot wire 14. Satisfactory results in thus cutting one of the layers of glass are also obtainable with a single heated wire where the glass is of high quality, particularly where the glass is relatively thin. We have discovered that the first of the two layers of glass to be cut of laminated glass, even where the desired line of cutting is of substantial length, may be under some conditions relatively quickly and quite accurately cut by the use of a single hot wire without supplemental means. In fact, the results thus obtainable in cutting the first layer of glass to be cut of laminated glass, are much better and more uniform than would be the case if the same process were applied to single glass, not laminated. Nevertheless, to expedite the cutting process and to insure the reliability thereof, for curved as well as straight lines, substantially regardless of the thickness of the glass and the length of the desired line of cutting, we find it preferable to use supplemental heating means as schematically indicated at 15 and 16 in Fig. 1. The devices 15 and 16 if desired may comprise heating plates of the type shown in our Patent No. 1,719,588, dated July 2, 1929. Or, if desired, the members 15 and 16 may comprise heated sheets or bars maintained at the desired temperature in any convenient manner as by internal electrical heating coils or by the direct application of a flame.

The devices 15 and 16 are preferably spaced at least slightly from the surface of the glass so as to assure proper warming of the zone adjacent the cutting line, but without heating any points or areas to a temperature comparable to the temperature established by the wire 14.

Also, if desired, the members 15 and 16 may be replaced by an arrangement of hot wires such for example as indicated in Fig. 4, wherein the wire 14 is shown at the desired line of cutting and this wire is flanked by a plurality of wires as at 17 for warming the zone of cutting to the desired degree. Although it has been found desirable to heat this zone uniformly along its length, the degree of heating may be made to taper off gradually at each side of the line of cutting. Therefore, the wires 17 may be conveniently positioned in an arcuate arrangement as shown.

The warming of the zone adjacent the line of cutting by the above described apparatus, serves to cooperate with the wire 14, whereby the glass is expanded in such manner as to preclude any uncontrollable shattering or divergence of the line of cracking from the desired line of separation, but where a single hot wire as at 14 is used without supplemental heating means, it will be appreciated that a strip of glass, contacting with this wire, will be quickly expanded a substantial amount, and if the line of cutting is a long one, the total of this expansion will be so great as to cause tensions in the glass resulting in side cracks and shattering. That is, the areas immediately adjacent this expanded strip of glass will retain their normal dimensions and there will be sharply defined boundary areas, one side of each of which will be heated and expanded considerably, and the other side of which will be relatively cold and not expanded. Devices or wires as at 15, 16 and 17, however, will serve to enlarge the areas over which the temperature differences occur and so reduce the temperature gradient that the resiliency of the glass can accommodate the expansion forces without shattering or uncontrolled cracking.

When the above described devices are applied to the desired line of cutting on the sheet of glass 11, this sheet of glass will be quickly and accurately cracked along said line, usually within a few seconds. The time required may ordinarily be somewhat reduced and the dependability of the process assured if a small nick is made at the line of cutting at one edge of the glass.

Now, in order to crack the sheet of glass 12 accurately, and in alignment with the crack in the sheet 11, the following process is preferred.

Referring to Fig. 2, a diamond or glass cutting wheel scratch as at 18 is made on glass sheet 12, exactly in alignment with the crack 19 already made in sheet 11. Then with the glass positioned on a support as at 20, the sheet 12 may be readily cracked by striking the same as indicated in Fig. 2 with a relatively soft mallet or similar implement 21. Both sheets of glass will now be cracked accurately along the desired line of separation and it only remains to cut the layer of viscose in order to separate the parts.

If desired, instead of utilizing a diamond or equivalent means in cracking the second layer of glass, both layers may be simultaneously or successively cracked by the use of heating means as described in connection with Figs. 1 and 4. Nevertheless, under certain circumstances, this involves uncertainties, since it is somewhat difficult to insure simultaneous cracking of both sheets of glass by the use of heating means and if simultaneous cracking is attempted but does not occur, the cracking of the second sheet will sometimes be influenced by the heat applied to the first sheet so that prompt accurate cracking may be interfered with. On the other hand, if electrical cracking means are used for both sheets, and are used in succession and not simultaneously, time must preferably be taken for the glass parts to cool after the first sheet is cut, so that the heat therefrom which is radiated through the viscose to the second sheet, will not interfere with the cutting of the second sheet.

Also, if desired, especially with relatively small sheets of laminated glass, it may be found possible to cut both sheets by the use of diamond or wheel scratches followed by carefully controlled application of pressure or restrained blows or jars. However, in such attempts, we find that in cutting the first sheet, great difficulty is encountered because of the firm supporting effect which the second sheet of glass (as yet uncut) lends to the first.

These circumstances lead us at present, at least, to prefer the process first above described, whereby both sheets may be quickly cut with a high degree of accuracy at the desired line.

Even though both sheets of glass have been cracked along a desired line, it will be observed that the viscose will serve to retain the cracked edges firmly in abutment, leaving no space through which access may be had to the viscose. Therefore the severing of the viscose has heretofore remained a commercially insurmountable problem. It will be understood that it is important to have the two layers of glass and the layer of viscose accurately co-extensive at their edges, not only for good appearance, but to avoid cavities between the glass edges which might accumulate dirt and which would tend to admit and retain moisture and atmospheric gases. This in turn would cause deterioration which would eventually progress into the viscose of the main body of glass and thus ruin the glass for practical use. Heretofore to obtain such co-extensive edges of the viscose and glass laminations, it has been necessary to grind away substantial amounts of the glass, not only because of the impossibility heretofore of cutting both glass layers accurately to the desired template, but also because of the "pulling out" of portions of the viscose. Such grinding operations generally render the cost of salvaging cracked laminated glass commercially prohibitive. However, these difficulties may be eliminated by the following described process, according to which the desired co-extensive edges may be secured, rendering grinding operations unnecessary except for beveling purposes and polishing.

Hot wires as at 22 and 23 are first placed along the cracked lines 18 and 19 respectively for very quickly heating the glass locally along said lines to a temperature sufficient to quickly soften the viscose at said lines to permit the severed pieces of glass to be quickly pulled apart. If desired, this phase of the process may be performed merely by using a single wire as at 22, yet the process may be practiced more rapidly, and usually with somewhat better results, by using the two wires 22 and 23. If desired, the same wire 14 and its supporting structure may be utilized in lieu of using a different wire 22.

The wires 22 and 23 in addition to immediately softening the viscose locally at the desired cutting line only, serve the further function of rapidly expanding the cellulose at the desired line, or permitting its adhesive action to almost immediately be sufficiently reduced so that any transverse forces which happen to be applied to the glass parts in separating the same, will not result in cracking or chipping the severed edges and corners of the glass. That is, the viscose will yield before such forces are applied to the glass edges and corners as might cause cracking. With the process as above described, the glass parts will be separated without disturbance of the viscose within the severed edges, except possibly in some instances a narrow strip less than $\tfrac{1}{32}$nd of an inch in width. After separating the severed pieces, feather edges of viscose will remain protruding from one or both edges. Now, if a heated object is passed along the severed edges, these feather edges of viscose will be pressed back into sealing relationship with the glass laminations, which will more or less completely restore the viscose along the very narrow strip which has been pulled out and seal in any small remaining air pockets between the severed edges against access of the atmosphere and moisture. Any desired supplemental sealing means thereafter may also be applied.

The laminated glass edges as resulting from the process above described, are satisfactory for many commercial purposes, particularly where the edges are to be retained and more or less concealed in window frames, etc. However, where it is desired to provide a laminated glass edge within which the viscose is free from disturbance at the very edge of the glass, the above described process may be supplemented by the features hereinafter described.

The following described process is particularly applicable to the cutting of laminated glass where it is desired to provide edges substantially without grinding operations and which are to be freely exposed in use, as with certain of the edges of automobile window and windshield glass.

As indicated in Fig. 3, supplemental heating wires are shown at 24 and 25, running parallel to the wires 22 and 23 respectively and for heating the glass at one side of the cracked line to a temperature higher than at the other side. Such heating results in the softening of the viscose to a much greater degree at one side of the cracked line than at the other, whereby when the parts are separated, merely a narrow strip of the viscose will be removed from between the edges of one of the severed pieces, whereas the viscose within the corresponding edges of the other piece will remain wholly intact to the very edge.

Therefore the piece of laminated glass opposite the wires 24 and 25 may be applied to uses where an exposed edge is necessary, whereas the piece of glass embraced by the wires 22 and 24 may be either retrimmed to secure a perfect edge or may be utilized under circumstances where the edge is not exposed. Ordinarily it is unnecessary to have more than one edge of laminated glass exposed in use, as is the case with windshield and automobile window glass. Therefore a series of pieces of glass such as windows or windshields may be cut from an extended piece of glass by this process in a manner whereby the edges which are to be exposed in use are substantially perfect with the viscose in proper normal condition to the very edge of the glass, the edges which are not wholly in this condition being concealed in the window frame.

If desired, satisfactory results may be obtained by using but one of the wires 24 and 25, although the process may be somewhat more rapidly performed with dependability by utilizing both wires. Also, if desired, these wires may be replaced by heating units such as indicated at 16, although we now prefer to limit this warming action to a very narrow strip immediately adjacent the wires 22 and 23.

If desired, the wires 22 and 23 may be first applied at the desired line of cracking and then moved in respect to the glass so as to assume the positions indicated of wires 24 and 25 and serve the function thereof. Thereby the heating of the glass at one side of the line of cracking to a temperature at least slightly higher than at the line of cracking is assured so that the viscose is not disturbed between the edges of the other severed piece. Yet the viscose at the line of cutting will remain sufficiently warmed so that there will be no danger of chipping or cracking away of the glass edges and corners.

While the invention has been described in detail with respect to certain particular preferred examples thereof which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent of the United States is:

1. The process of cutting laminated glass having a plurality of layers between which shatter preventing and binding material is interposed, which comprises cracking the glass layers along the predetermined line of separation, the binding material at said line being separated by the application of an electrically heated conductor applied at said line for quickly and locally heating the glass and binding material at said line to soften the latter along said line only to a degree readily permitting the separation, while leaving the binding material intact at points substantially spaced from said line.

2. Process of cutting laminated glass having a plurality of layers of glass between which shatter preventing and binding material is interposed, which comprises cracking the glass along a desired line of separation, and then applying an intense localized heat at said line by the use of electrically heated conducting means to quickly and substantially uniformly soften the binding material at said line within a narrow zone only, to permit separation along the desired line without disturbance of the binding material remote from said line, and then discontinuing the heating and promptly separating the glass at said line before the heat within said zone has substantially radiated to the adjacent glass and before the binding material has substantially hardened.

3. Process of severing laminated glass of which the laminations are secured together by shatter preventing material, which comprises successively and independently cracking the laminations of the glass respectively along the desired line of severing, and then separating the shatter preventing material at said line by the controlled application of a high temperature at said line for quickly heating the glass and binding material at said line to soften the latter locally while leaving the binding material intact at points substantially spaced from said line.

4. Process of severing laminated glass of which the laminations are secured together by shatter preventing binding material, which comprises cracking the glass layers along a predetermined line of separation, the binding material at said line being separated by the controlled application of heat along said line only, sufficient to soften only a narrow strip of the binding material at said line.

5. Process of severing laminated glass of which the laminations are secured together by shatter preventing binding material, which comprises cracking the glass layers along a predetermined line of separation, the binding material at said line being separated by the application of electrically heated wires to the glass surfaces respectively at said line to quickly and locally heat the glass and binding material at said line to soften said material locally along said line to permit separation of the severed pieces without disturbance of the binding material within the glass edges at points substantially spaced from said line.

6. Apparatus for cracking glass along a desired line, comprising a plurality of substantially parallel heated elements, one of which extends along the desired line of cracking and the others of which are arranged to warm a zone on the glass adjacent said line.

7. Process of severing laminated glass along a predetermined desired line, the laminations being secured together by shatter preventing material, which comprises cracking the laminations of the glass respectively along said line, and then separating the shatter preventing material at said line by the application of a hot wire at said line for quickly heating the glass and binding material at said line to soften the latter locally and to expand the latter to widen the crack in the glass for permitting forceful pulling apart of the glass sections without danger of chipping the glass edges and leaving the binding material intact at points substantially spaced from said line.

8. Process of cutting laminated glass having a plurality of layers of glass between which shatter preventing and binding material is interposed, which comprises cracking the glass along a desired line of separation, then applying an intense localized heat at said line by the use of electrically heated conducting means to quickly and substantially uniformly soften the binding material at said line within a narrow zone only, to permit separation along the desired line without disturbance of the binding material remote from said line, separating the glass at said line before the heat within said zone has substantially radiated to the adjacent glass and before the binding material has substantially hardened, and pressing a hot object against any of the binding material protruding from the glass edges to soften the same and compact it against said edges.

9. In the art of sectionally separating a glass structure having shatter-preventing and binding material interposed between glass laminations fractured along a predetermined line extending from edge to edge thereof, the steps which consist in applying a hot elongated structure directly to at least one of said laminations throughout the entire length of said line thereby heating the glass and said material at said line and only immediately adjacent thereto, and immediately applying force to said glass structure whereby said material is separated at said line without substantial disturbance thereof between said laminations.

In testimony whereof we have signed our names to this specification.

FURMAN N. CAMPBELL.
JULES MYATT.